US005446478A

United States Patent [19]

Larson

[11] Patent Number: 5,446,478

[45] Date of Patent: Aug. 29, 1995

[54] METHOD AND DEVICE FOR CLEANING AN ELECTRODE MATRIX OF AN ELECTROGRAPHIC PRINTER

[75] Inventor: Ove Larson, Västra Frölunda, Sweden

[73] Assignee: Array Printers AB, Molndal, Sweden

[21] Appl. No.: 781,208

[22] PCT Filed: Jun. 7, 1990

[86] PCT No.: PCT/SE90/00394

§ 371 Date: Dec. 6, 1991

§ 102(e) Date: Dec. 6, 1991

[87] PCT Pub. No.: WO90/14959

PCT Pub. Date: Dec. 13, 1990

[30] Foreign Application Priority Data

Jun. 7, 1989 [SE] Sweden ................................ 8902090

[51] Int. Cl.[6] ................................ G01D 15/06

[52] U.S. Cl. ................................ 347/158; 355/264; 355/269

[58] Field of Search ................................ 118/652; 346/159; 355/215, 264, 269

[56] References Cited

U.S. PATENT DOCUMENTS 4,478,510 10/1984 Fujii et al. ................ 355/215 X
4,483,611 11/1984 Matsuura et al. ................ 118/652 X
4,755,837 7/1988 Schmidlin et al. ................ 346/155
4,829,338 5/1989 Whittaker et al. ................ 118/652 X
4,903,049 2/1990 Sotack ................ 346/159
5,027,744 7/1991 Miyashita et al. ................ 355/264 X
5,036,341 7/1991 Larsson ................ 346/154

FOREIGN PATENT DOCUMENTS 0266960 10/1987 European Pat. Off. .
2853141 12/1978 Germany .

OTHER PUBLICATIONS

Patent Abstracts of Japan, vol. 10, No. 147, P460, JP 60-263964, Publ. 1985 Dec. 27.
Patent Abstracts of Japan, vol. 10, No. 142, M481, JP 60-264264, Publ. 1985 Dec. 27.

*Primary Examiner*—A. T. Grimley
*Assistant Examiner*—Nestor R. Ramirez
*Attorney, Agent, or Firm*—Ostrolenk, Faber, Gerb & Soffen

[57] ABSTRACT

A method and device for improving the printing performance of electrographic printers, in which a latent electrical charge pattern of electric signals is produced by an electrode matrix or the like, which temporarily produces electrical fields for attraction of pigment particles toward an information carrier. The electrodes of the electrode matrix are exposed, during at least a portion of the time between the printing of subsequent paper sheets, to a cleaning force which removes the pigment particles from the electrode matrix.

16 Claims, 6 Drawing Sheets

FIG. 6
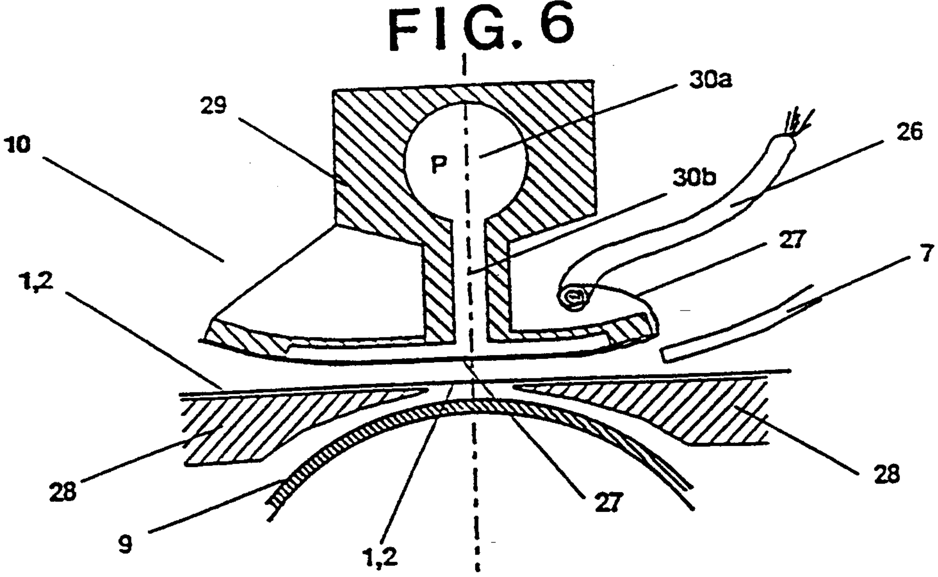
FIG. 7
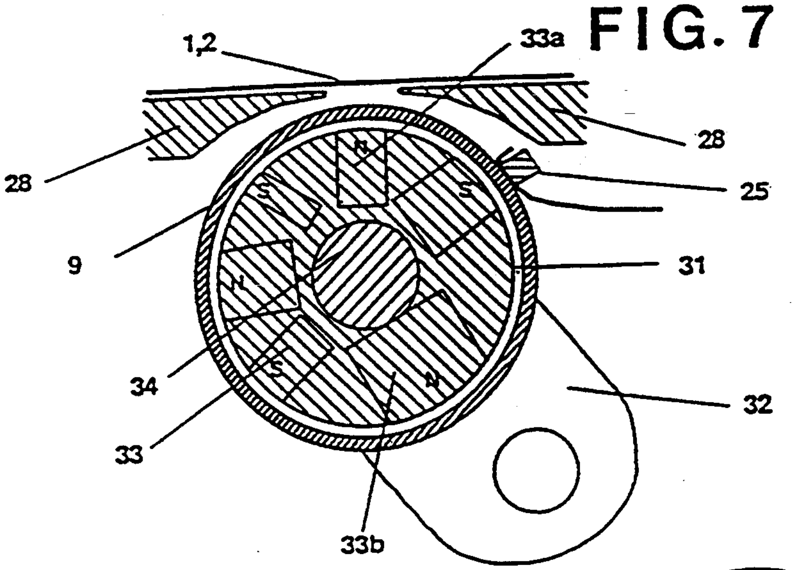
FIG. 8A
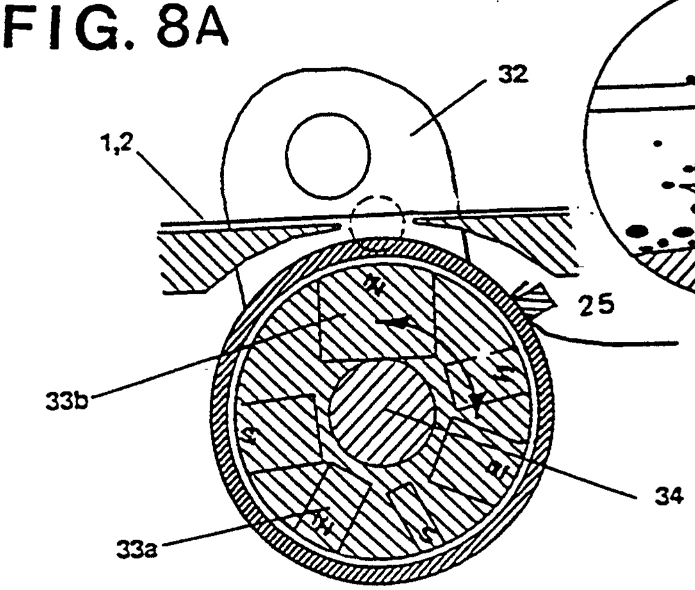
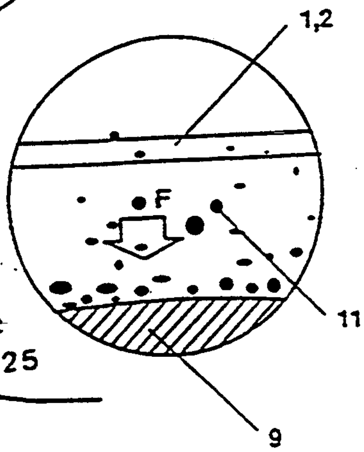
FIG. 8B

METHOD AND DEVICE FOR CLEANING AN ELECTRODE MATRIX OF AN ELECTROGRAPHIC PRINTER

BACKGROUND OF THE INVENTION

1. Field of the Invention

The invention relates to a method and device for improving the printing quality and performance of electrographic printers, in which a latent electrical charge pattern of electric signals is produced by means of an electrode matrix or the like, which temporarily produces electrical fields for attraction of pigment particles towards an information carrier.

2. Description of the Related Art

International Patent Application PCT/SE88/00653 discloses a method for developing pictures and text with pigment particles on an information carrier directly from computer-generated electric signals, without the need for these signals to be intermediately stored for a temporary conversion to light energy, which is necessary for photoconductive printers, e.g., laser printers. These problems have been solved by bringing the information carrier into electrical cooperation with at least a screen or preferably a lattice-shaped electrode matrix which through control in accordance with the configuration of the desired pattern, at least partly opens and closes passages through the matrix, which is galvanically connected to at least one voltage source. An electrical field is exposed through the open passages for attraction of the pigment particles towards the information carrier.

This method, herein referred to as the EMS concept, and described in the above-mentioned patent application, may result in printing which does not have a high enough quality, especially with repeated and continuous use.

A problem which can occur with repeated and continuous use of devices according to the EMS concept is that electrodes of the electrode matrix gradually become covered with toner. This gradual covering in itself does not necessarily bring about any degradation of the quality of the print, but under certain circumstances the print may degenerate when certain meshes are blocked or when excess toner quantities are deposited on the paper, whereby the print becomes uneven and bleached, the definition disappears, and the blackness of the print becomes too high.

Another problem which occurs with the development in the EMS concept concerns the magnetic field which normally is required for the transport of toner from its container to the immediate proximity of the electrode matrix. The most common method when using magnetic toners is to let the roller which transports the toner, herein referred to as the developing roller, surround a core having several magnetic poles, the magnetic flow of which is substantially directed orthogonal to the longitudinal axis of the roller. Since commercially available developers are almost exclusively used in photoconductive printers and copiers, the poles of the magnetic cores have been dimensioned and oriented such that the development of toner shall be as favorable as possible during a short path along the periphery of the envelope surface of the developing roller. Several embodiments of the EMS concept are based on multiple line electrode matrices where development must be possible along a longer path of the periphery of the developing roller than in the case of photoconductive processes. The extension of the electrode matrix in certain cases may demand a path ten times longer. When using the design of magnetic poles which is common today, the printing in the mesh lines which are situated furthest from the center of the magnetic pole, in which proximity development is intended to take place, will be weaker or not appear at all as a result of a non-optimal magnetic field pattern in these areas. Further, the curvature of the envelope surface of the developing roller often cooperates with these non-optimal magnetic forces in an unfavorable way, so that the conditions for good printing quality further are degraded at the outermost lines of the electrode matrix.

These above-described problems are not limited to the EMS concept, but are also present, wholly or partially, in several electrographic printer concepts, where passage of the toner is created in an electrical manner.

Common to all problems described herein, another drawback of the known technique is that the printing quality, and thereby the readability, is influenced negatively, resulting in reduced competitiveness and lower consumer value.

SUMMARY OF THE INVENTION

The object of the invention is to create a method which allows the EMS and other electrographic printer concepts to produce high quality prints with good readability, even during such circumstances when the device operates continuously without maintenance and service. These problems have been solved by exposing the electrodes of the electrode matrix, at least during a portion of the break time between activation periods, to a cleaning field which transports the pigment away particles from the electrodes.

BRIEF DESCRIPTION OF THE DRAWINGS

The invention will be described in greater detail with reference to the accompanying drawings, in which different embodiments are shown.

FIG. 6 illustrates a cross-section through a plate electrode having a retainer intended for blowing and/or vacuuming cleaning of a printing slot.

FIGS. 7, 8*a* and 8*b* illustrate cross-sections through a rotatable magnet core, which can magnetically clean the electrode matrix of any possible remaining toner.

DETAILED DESCRIPTION OF THE PREFERRED EMBODIMENTS

Figure 1:
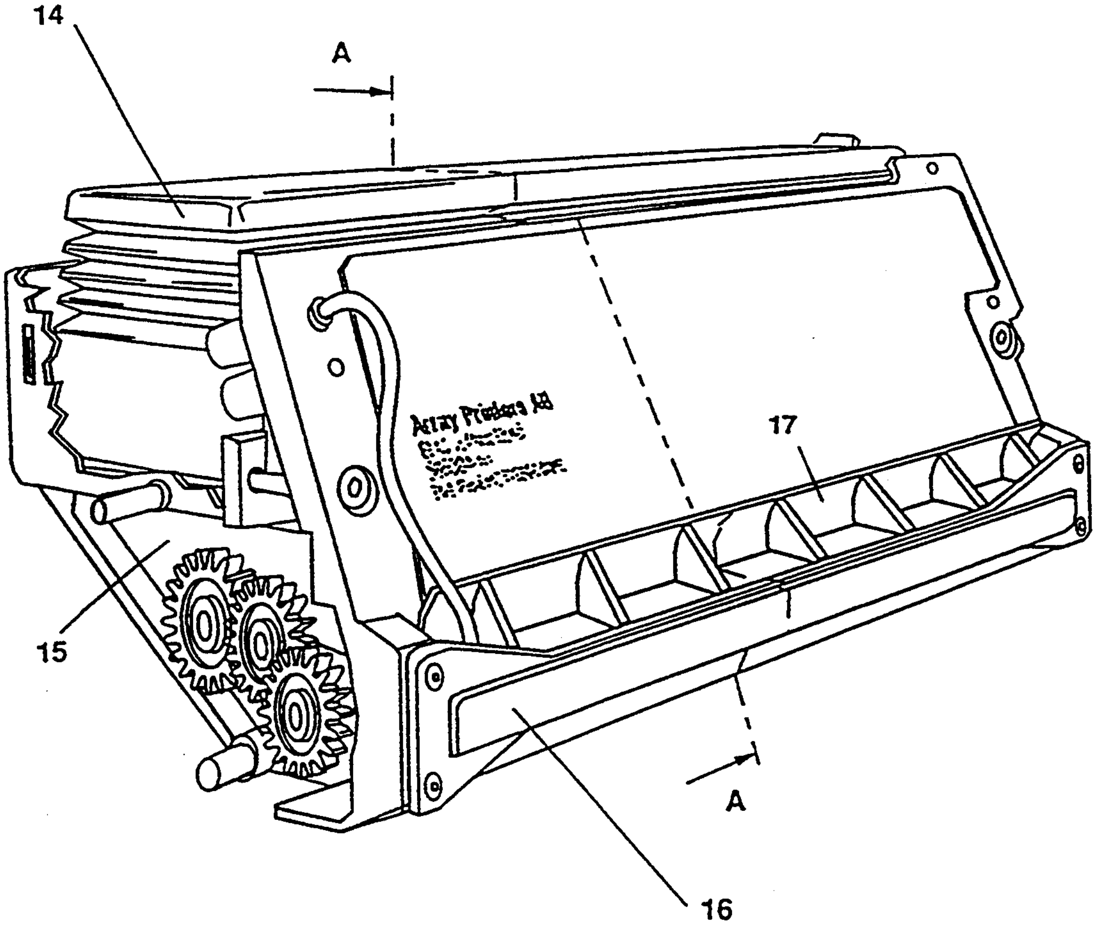
FIG. 1 shows a perspective view of a developer provided with a print head and a bellow formed toner container for vacuum cleaning of the electrode matrix.

In the drawings, the numeral 1 designates an electrode, called a print electrode, of an electrode matrix, the extension of which is substantially parallel to the direction of movement of the paper. A second electrode 2, called a transversal electrode, is located in the same electrode matrix. The extension of electrode 2 is substantially transverse to the direction of movement of the paper. Reference numeral 3 designates a passage or mesh through the electrode matrix, between the electrodes 1, 2, through which transport of toner takes place during development. Numeral 7 designates an information carrier, e.g., a sheet of paper disposed between the electrodes and a developing roller 9. Pigment particles 11 (also called the toner) are transported from a container 14 to the vicinity of the electrode matrix. Numeral 10 designates a background electrode, which can be a so-called plate electrode. Numeral 15 designates a developer and numeral 16 designates a print head which includes the electrode matrix 1,2, drive electronics, the plate or backing electrode 10 and a retainer for these elements. Numeral 17 designates a print slot in the proximity of the electrode matrix, through which toner passes or sticks during development. A bellow-shaped container 18 contains the toner, which can be expanded and contracted, such that an air stream or, alternatively, a pressure can be produced inside the developer.

Figure 3:
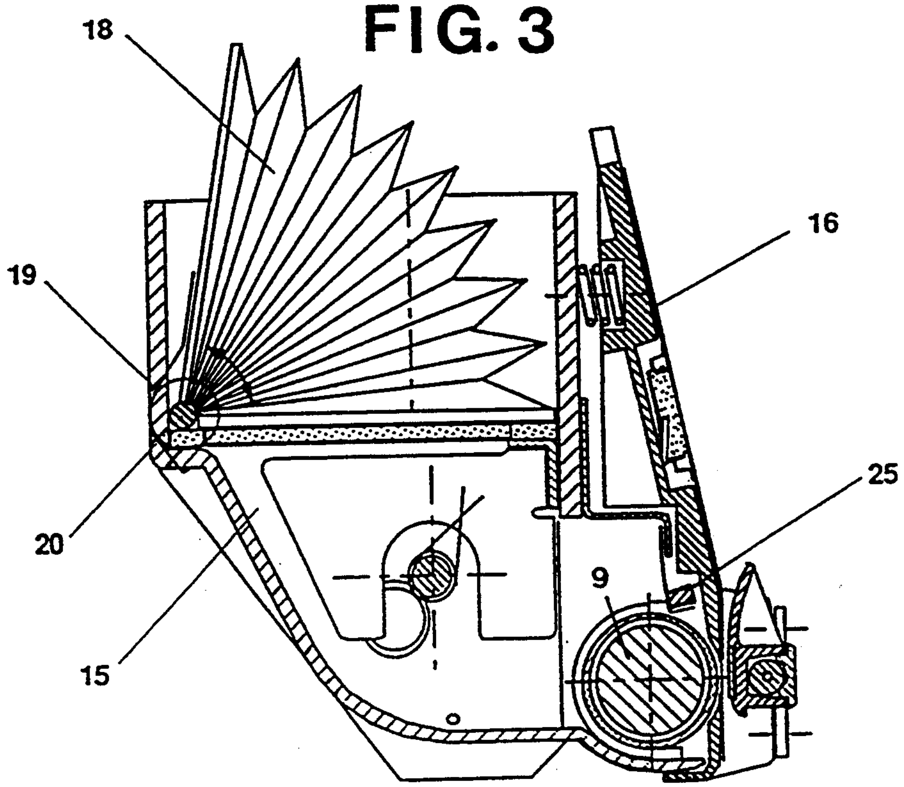
FIG. 3 is a cross-section of a modified developer with a mounted printhead and a rotatable bellow-shaped container for the toner.

According to FIG. 3, the toner container is constituted by a bellows 18, which is rotatable about a torsional spring 19, which operates to keep the rotatable bellows in an expanded position, having a maximum contained air volume.

Figure 4:
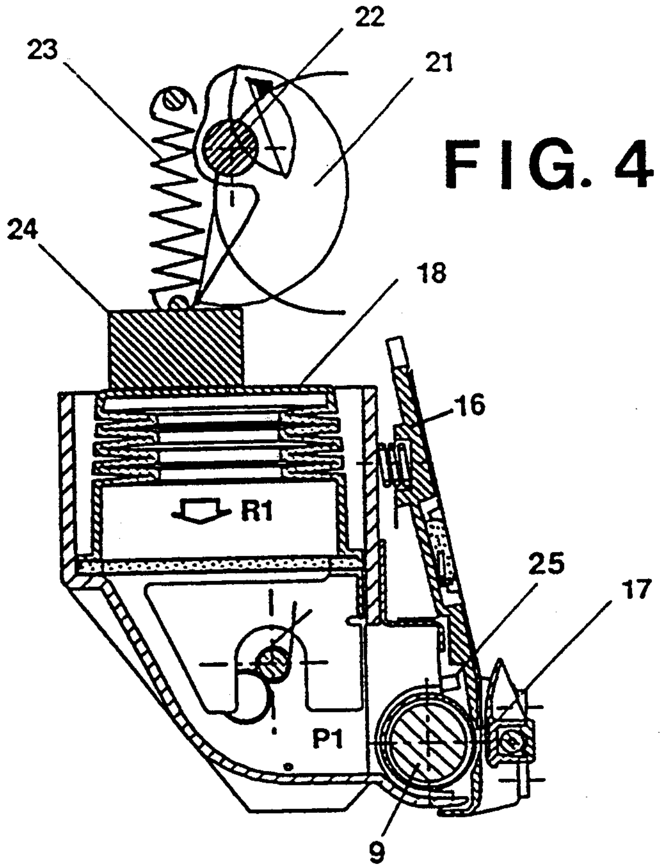
FIG. 4 is a cross-section of a further embodiment of a developer with a printhead according to FIG. 2, the bellow-shaped toner container of which is compressed by a rotatable device.
Figure 5:
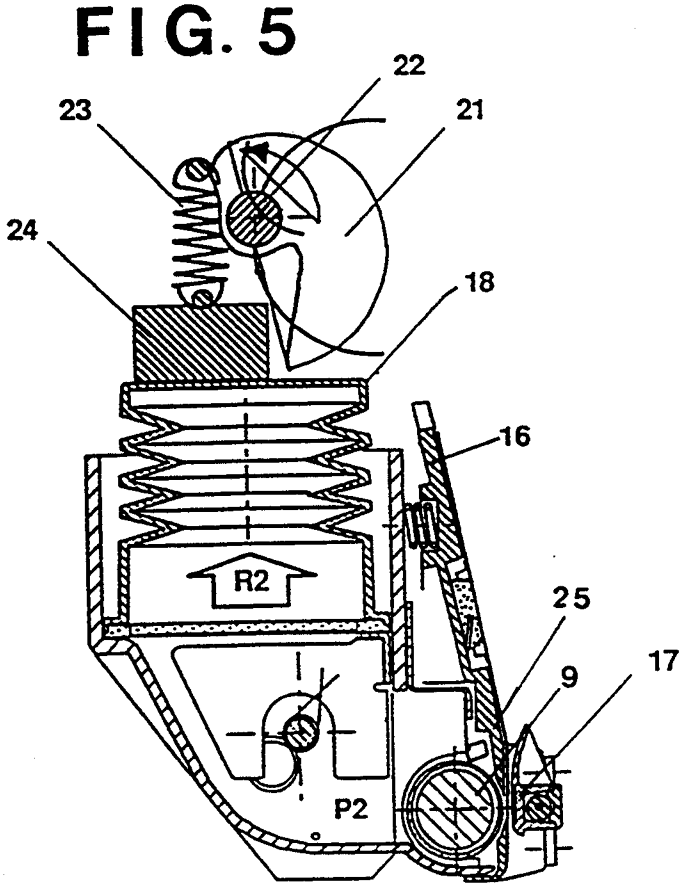
FIG. 5 shows the developer according to FIG. 4, the bellow-shaped toner container of which being expanded.

In the embodiment according to FIGS. 4 and 5, movement of the bellows is achieved by an eccentrically formed turn disc 21, which is rotatable about a rotation axis 22, and which disc is intended to compress the bellows 18. A tension spring 23 keeps the bellows 18 in an expanded position with the maximum contained air volume. The reference numeral 24 designates a thrust plate for transmission of pressure forces from the eccentric disc 21. By means of a magnetic scraper 25, the correct amount of toner is delivered to the developing roller 9.

The background electrode 10 in FIG. 6 is supplied with high voltage via a cable 26 and an electrically conductive plate comprised of a net or other porous material 27. Electrode 27 does not produce an inhomogeneous pressure and admits passage of air streams in both directions, transversely versus the area of the means, which can be a permeable plate electrode. Reference numeral 28 designates a retainer for the electrode matrix and other equipment belonging thereto, e.g., the drive electronics. A retainer for the permeable plate electrode 27 is designated by reference numeral 29. A cavity **30*a*, 30*b* is arranged in the plate electrode retainer 29 for the transport of air to and/or from the print slot 17**.

In the embodiments according to FIGS. 7–11, reference numeral 31 designates a magnetic core containing one or several magnetic poles. A lever 32 rotates the magnetic core 31. Reference numeral 33 is a magnetic pole in the magnetic core and reference numeral 34 is a rotation axis which can be centrically or eccentrically located in the rotatable magnetic core. Magnetic field lines 35 are located between two poles in the magnetic core or between the magnetic core and the magnetic scrape 25.

Figure 2:
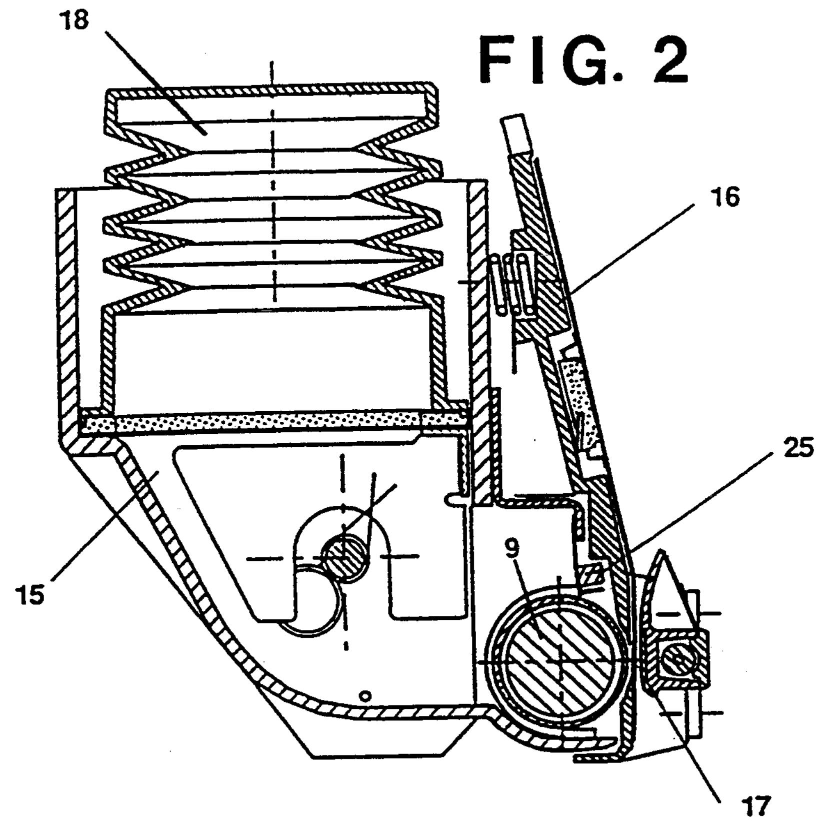
FIG. 2 is a cross-section of a developer mounted on the print head according to FIG. 1.

By letting an air stream pass through the pressure slot 17 for a very short time, the electrode matrix can be effectively cleaned from possible remaining toner particles. An embodiment of this type is shown in FIGS. 1 and 2. As shown therein, a conventional toner container is replaced by a bellow formed container 18, which can be expanded and compressed by applying forces to the top of the container. An operating device, e.g., an electromagnet or a rotating eccentric device automatically expands or compresses the container, preferably during forward feeding of a new sheet of paper.

One embodiment of an eccentric disc is shown in FIGS. 4 and 5. The device can be used both to generate an air stream directed outwards, i.e. blowing from the container and an inwardly directed suction air stream. It is, however, desirable to use the suction stream since toner can be returned to the container. During compression of the container, an air stream is blown through the pressure slot 17, and toner is spread in the machine. After prolonged operation, troublesome contamination of the matrix contained in the printer occurs. To avoid this, the container 18 should be slowly compressed, as shown by the movement of arrow R1, during development. This is shown in FIG. 4. The pressure P1 generated by the compression of the container causes extremely limited air transport out of the developer, which does not disturb the developing process. Thereafter, when the paper or information carrier has passed by the pressure slot 17 and the electrode matrix is to be cleaned, the operating device, i.e. the rotating device 22, 21, rapidly releases the container 18, pretensioned by the springs 23, so that a very rapid expansion R2 of the container 18 occurs, causing a relatively large negative pressure P2 in the developer. The air stream produced hereby through the pressure slot 17 is powerful enough to clean not only the electrodes but also adjacent areas from any remaining toner.

In FIG. 3, another embodiment of the bellow-formed container is shown, which is mainly compressed by rotating movements. The foldings of the container 18 converge towards a rotation center in the shaft 20 and are fit on and sealed against the shaft. A torsion spring 19 pretensions the container 18, so that it is in a nonactuated state and contains the largest possible amount of air. The container can then be compressed to operate according to the description of the embodiment according to FIG. 2, by a relatively slow movement transferred to the shaft 20. The torque produced which is necessary to keep the container compressed maximally can be released at a suitable time between the development of two paper sheets. The pressure slot in this way will be cleaned and prepared for development of additional sheets. It is also possible to replace conventional toner stirring devices in the developer with the above-described device, since the powerful and short negative pressure P2 stirs up the toner in the developer.

Another method to clean the electrode matrix from remaining toner 11 is to blow and/or suction the plate electrode 10. Such an embodiment is shown in FIG. 6. A cavity **30*a* from an external pump or a fan unit can be supplied with negative pressure P. The permeable plate electrode 27, which is connected to a high voltage source through the cable 26, allows air streams to freely pass through the slot shaped cavity 30*b* of the retainer 29**. The produced air stream will clean the electrode matrix and surrounding areas in the same way as described earlier.

In addition to the device in FIG. 6 which can be used as cleaning means between the development of sheets, the device can also be used to apply suction to the paper to fit the paper against the backing electrode during the development process. The cavity is then provided with a weak negative pressure P, which does not lock or block the paper from sliding on the conducting plate electrode 27.

A further method for cleaning the electrode matrix is shown in FIGS. 7, 8*a* and 8*b*. One of the magnetic poles 33*b* in magnetic core 31 can be provided with an extra powerful magnetic flow. During development, this so-called decontamination pole 33*b* should be placed downwards in the toner heap, so that the developing process is not affected. This is shown in FIG. 7. When cleaning is to be carried out, a rotating apparatus rotates the magnetic core 31, so that the decontamination pole is positioned under the pressure slot 17. This is shown in FIGS. 8*a* and 8*b*. The magnetic force F produced on the magnetic toner particles should be dimensioned such that the particles are pulled from the electrodes 1, 2 downward toward the developing roller 9. After cleaning is completed, which is carried out in a very short time, the magnetic core 31 is rotated such that the decontamination pole 33*b* is displaced downwards and the transfer pole is positioned under the pressure slot 17.

Figure 9:
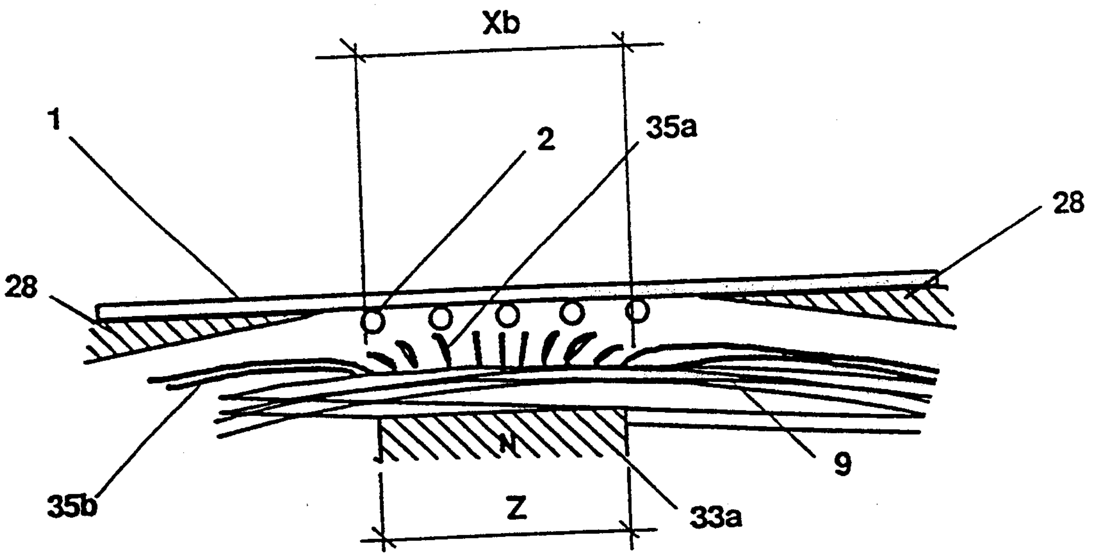
FIGS. 9 and 10 show how a transfer pole in a magnet core according to FIG. 7 can be changed in order to increase the available zone where developing is allowed.
Figure 10:
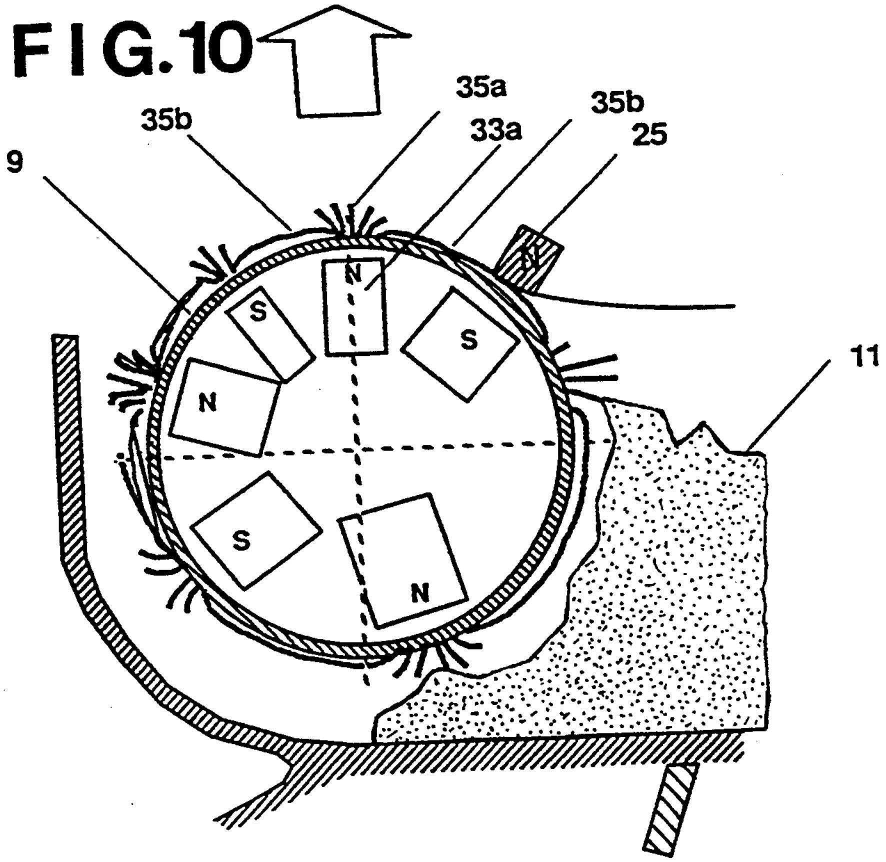

FIGS. 9 and 10 illustrate how the toner particles form magnetic dipole chains 35 which substantially follow the magnetic field lines between the polls 33 of the above-described system. Certain chains 35*b* form closed bridges between two poles, while other dipole chains are broken and form a "forest" of standing dipole chains which constitute a developing zone, shown enlarged in FIG. 9. The width of this area in FIG. 9 is designated by Xb. When using multiline electrode matrices it is desirable to broaden this area compared to what is common in photoconductive printers, so that all lines in the electrode matrix end up over standing dipole chains 35*a*. This can be advantageously be carried out by increasing the active pole width Z. Another way is to increase the distance between the pole 33*a* and the envelope surface of the developer roller 9.

Figure 11:
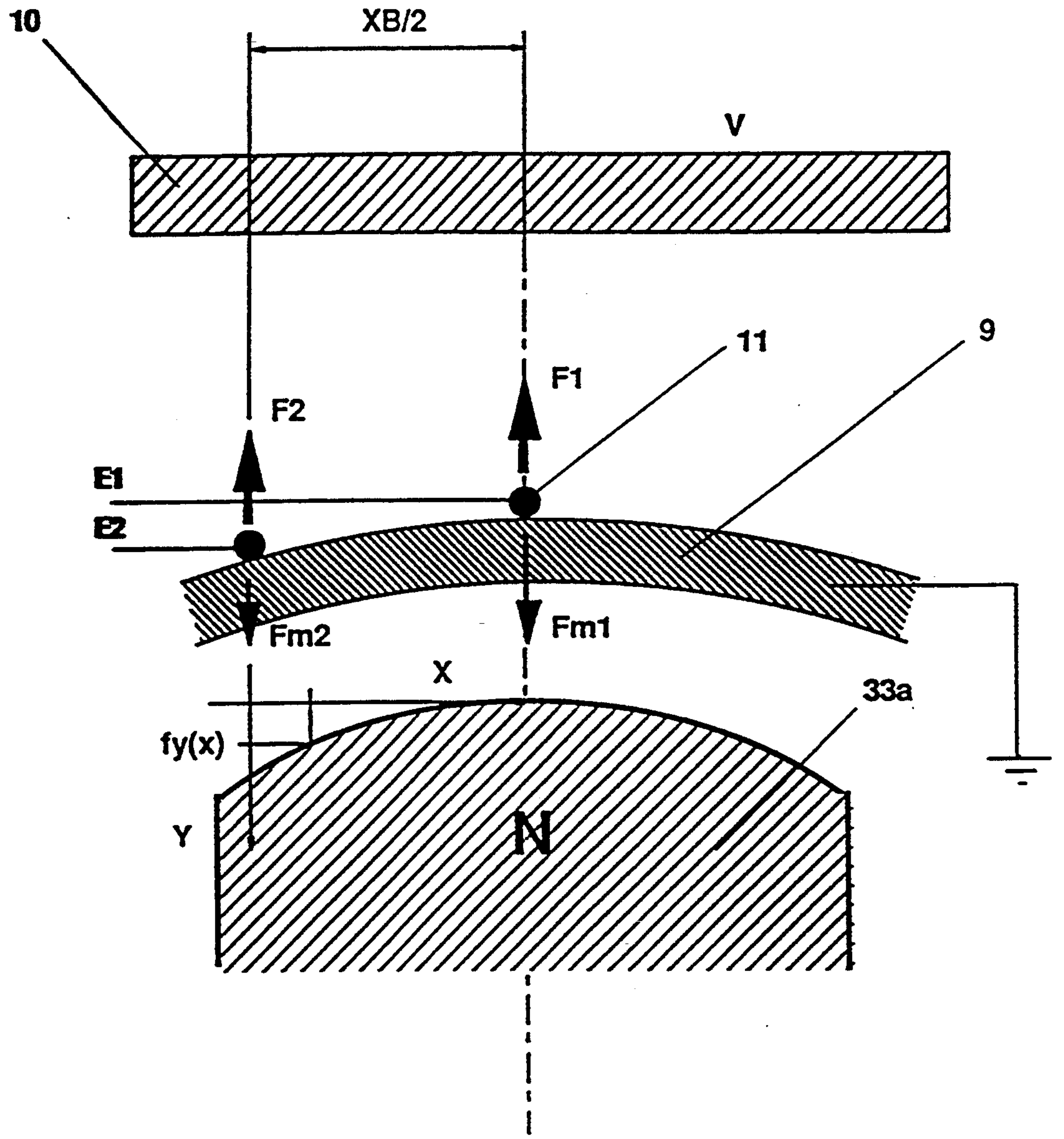
FIG. 11 shows how a transfer pole in a magnetic core can be changed in order to equalize the blackness in different meshes.

FIG. 11 shows a further improvement of the magnetic field of the magnetic pole. The curvature of the envelope surface of the developer roll 9 causes an increased distance between toner particles which are placed at the side of the highest point of the roller. This in turn causes the field strength from a plane plate electrode to vary with the toner particles E1 and E2. This property of developing rollers with a relatively small diameter causes lower blackness in peripherally placed lines. The total forces F on a particle is, however, a fusion of several acting forces on the particles, of which the electrostatic and the magnetic forces Fm are dominating. By compensating for the reduced electric field force E2 with reduced counter directed magnetic forces Fm2, the conditions for development become nearly identical for all meshes, irrespective of their position relative to the developing roller. This can be done by changing the profile fy(x) of the transfer pole 33. This can be changed such that the distance between the end surface of the pole and the internal envelope surface of the developing roller increases with the distance from the center line.

The invention is not limited to the above described embodiment. It is thus possible to apply the invention in other developing and pigment particle systems than those shown herein, e.g., mono component toner with carrier. Parts of the invention are also useful when the electrode is positioned behind the paper in a way that is described in e.g. PCT/SE88/00653.

The air stream for cleaning the electrode matrix can be generated in several other ways than those described, but still lies within the scope of the invention.

The number of poles of the magnetic core can be modified. Also, electromagnetic poles are possible within the scope of the invention. It may be advantageous to temporarily and for a short time increase the magnetic field force by increasing the energy through the coil which generates the flow in the transfer pole. The core then does not need to be rotated, as has been described above.

Although the present invention has been described in relation to the preferred embodiments thereof, many other variations and modifications will now become apparent to those skilled in the art without department from the scope of the invention. It is preferred, therefore, that the present invention be limited not by the specific disclosure herein, but only by the appended claims.

I claim:

1. A method of improving printing quality and performance of an electrographic printer in which a latent electrical charge pattern of electrical signals is produced by an electrode matrix, having electrodes, which temporarily produces electrical fields for attraction of pigment particles of a toner towards an information carrier, the matrix being disposed between a developer roller and a backing electrode, the method comprising the steps of:
 - exposing the electrodes of the electrode matrix, during at least a portion of time between printing of subsequent information carriers, to means for producing a cleaning force, wherein the means for producing the cleaning force comprises a bellowed container which, when expanded, produces a stream of air which vacuums the pigment particles from the electrode matrix; and
 - transporting the pigment particles to the developer roller and away from the electrode matrix by the cleaning force to remove the pigment particles from the electrode matrix.

2. The method of claim 1, wherein, in the step of transporting, the pigment particles are passed through a slotted area in close proximity to the electrode matrix, for a short period of time, during the feeding of a new information carrier.

3. The method of claim 2, wherein the stream of air is produced when the container is expanded quickly and a negative pressure is formed in the slotted area.

4. A method of improving printing quality and performance of an electrographic printer in which a latent electrical charge pattern of electrical signals is produced by an electrode matrix, having electrodes, which temporarily produces electrical fields for attraction of pigment particles of a toner towards an information carrier, the matrix being disposed between a developer roller and a backing electrode, the method comprising the steps of:
 - exposing the electrodes of the electrode matrix, during at least a portion of time between printing of subsequent information carriers, to means for producing a cleaning force, wherein the means for producing the cleaning force comprises a magnetic core positioned within the developer roller, the magnetic core generating a magnetic field for removing the pigment particles from the electrode matrix; and transporting the pigment particles to the developer roller and away from the matrix by the cleaning force to remove the pigment particles from the electrode matrix.

5. The method of claim 4, wherein in the step of transporting, the pigment particles are passed through a slotted area in close proximity to the electrode matrix, for a short period of time, during the feeding of a new information carrier.

6. A device for improving printing quality and performance of an electrographic printer in which a latent electrical charge pattern of electrical signals is produced in a print unit having an electrode matrix comprising electrodes and being disposed between a developer roller and a backing electrode, the electrode matrix temporarily producing electrical fields for attraction of pigment particles of a toner towards an information carrier, the device comprising:

a slotted area in the print unit in close proximity to the electrode matrix; and means for producing a cleaning force to transport the pigment particles toward the developer roller and away from the electrode matrix, wherein the means for producing the cleaning force comprises a bellowed pigment particle container and means for expanding or compressing the container, wherein, when the container is expanded, a stream of air is produced to remove the pigment particles from the electrode matrix.

7. The device of claim 6, wherein the expanding and compressing means comprises a rotating disc which expands the container, wherein, when the container is expanded, a negative pressure occurs in the slotted area to produce a stream of air through the slotted area to vacuum the pigment particles from the electrode matrix.

8. The device of claim 6, wherein the expanding and compressing means comprises a rotating disc which compresses the container, wherein, when the container is compressed, a stream of air is forced through the slotted area to blow the pigment particles from the electrode matrix.

9. A device for improving printing quality and performance of an electrographic printer in which a latent electrical charge pattern of electrical signals is produced in a print unit having an electrode matrix comprising electrodes and being disposed between a developer roller and a backing electrode, the electrode matrix temporarily producing electrical fields for attraction of pigment particles of a toner towards an information carrier, the device comprising:

a slotted area in the print unit in close proximity to the electrode matrix; and means for producing a cleaning force to transport the pigment particles toward the developer roller and away from the electrode matrix, wherein the means for producing the cleaning force comprises a magnet disposed within the developer roller, the magnet being movable between a passive position wherein the magnet is spaced from the slotted area and an active position wherein said magnet is at the slotted area, the magnet generating a magnetic field to remove the pigment particles from the electrode matrix.

10. A device for improving printing quality and performance of an electrographic printer in which a latent electrical charge pattern of electrical signals is produced in a print unit having an electrode matrix comprising electrodes and being disposed between a developer roller and a backing electrode, the electrode matrix temporarily producing electrical fields for attraction of pigment particles of a toner towards an information carrier, the device comprising:

a slotted area in the print unit in close proximity to the electrode matrix; and means for producing a cleaning force to transport the pigment particles toward the developer roller and away from the electrode matrix, wherein the means for producing the cleaning force comprises a magnetic core disposed within the developer roller, the magnetic core having at least one decontamination pole which produces a magnetic field in the slotted area, the magnetic field having an extension which corresponds to an extension of the electrode matrix.

11. The device of claim 10, wherein the decontamination pole has a curved pole surface, and the developer roller has an internal envelope surface, a radius of the pole surface of the decontamination pole being smaller than a radius of the internal envelope surface of the developer roller, such that a distance between an end surface of the pole and the internal envelope surface of the developer roller increases with a distance from a centerline of the pole.

12. A device for improving the printing quality and performance of electrographical printers in which a latent electrical charge pattern of electrical signals is produced in a print unit, the print unit having an electrode matrix disposed between a particle carrier and a backing electrode, the electrode matrix comprising a screen or grid of electrodes connected through a controlling device to a voltage source and a plurality of passages which are partly opened and closed electrostatically in response to control signals corresponding to image information applied to the electrode matrix for the controlled transmission of pigment particles of toner to an information carrier which is located between the background electrode and a developer roller, the background electrode and developer roller each being connected to at least one voltage source for producing electrostatic fields therebetween, the device comprising:

a slotted area in the print unit in close proximity to the electrode matrix; and means connected to the slotted area for producing a cleaning force to transport the pigment particles toward the developer roller and away from the electrode matrix, wherein the means for producing the cleaning force comprising a bellowed pigment particle container and means for expanding or compressing the container, wherein, when the container is expanded, a stream of air is produced to remove the pigment particles from the electrode matrix.

13. The device of claim 12, wherein the expanding and compressing means comprises a rotating disc which expands the container, wherein, when the container is expanded, a negative pressure occurs in the slotted area to produce a stream of air through the slotted area to vacuum the pigment particles from the electrode matrix.

14. A device for improving the printing quality and performance of electrographical printers in which a latent electrical charge pattern of electrical signals is produced in a print unit, the print unit having an electrode matrix disposed between a particle carrier and a backing electrode, the electrode matrix comprising a screen or grid of electrodes connected through a controlling device to a voltage source and a plurality of passages which are partly opened and closed electrostatically in response to control signals corresponding to image information applied to the electrode matrix for the controlled transmission of pigment particles of toner to an information carrier which is located between the background electrode and a developer roller, the background electrode and developer roller each being connected to at least one voltage source for producing electrostatic fields therebetween, the device comprising:

a slotted area in the print unit in close proximity to the electrode matrix; and means connected to the slotted area for producing a cleaning force to transport the pigment particles toward the developer roller and away from the electrode matrix, wherein the means for producing the cleaning force comprises a magnet disposed within the developer roller, the magnet being movable between a passive position wherein the magnet is spaced from the slotted area and an active position wherein said magnet is at the slotted area, the magnet producing a magnetic field to remove the pigment particles from the electrode matrix.

15. A device for improving the printing quality and performance of electrographical printers in which a latent electrical charge pattern of electrical signals is produced in a print unit, the print unit having an electrode matrix disposed between a particle carrier and a backing electrode, the electrode matrix comprising a screen or grid of electrodes connected through a controlling device to a voltage source and a plurality of passages which are partly opened and closed electrostatically in response to control signals corresponding to image information applied to the electrode matrix for the controlled transmission of pigment particles of toner to an information carrier which is located between the background electrode and a developer roller, the background electrode and developer roller each being connected to at least one voltage source for producing electrostatic fields therebetween, the device comprising:

a slotted area in the print unit in close proximity to the electrode matrix; and means connected to the slotted area for producing a cleaning force to transport the pigment particles toward the developer roller and away from the electrode matrix, wherein the means for producing the cleaning force comprises a magnetic core disposed within the developer roller, the magnetic core having at least one decontamination pole which produces a magnetic field in the slotted area, the magnetic field having an extension which corresponds to an extension of the electrode matrix.

16. The device of claim 15, wherein the decontamination pole has a curved pole surface, and the developer roller has an internal envelope surface, a radius of the pole surface of the decontamination pole being smaller than a radius of the internal envelope surface of the developer roller, such that a distance between an end surface of the pole and the internal envelope surface of the developer roller increases with a distance from a centerline of the pole.

* * * * *